(12) United States Patent
Saha et al.

(10) Patent No.: US 11,096,094 B1
(45) Date of Patent: Aug. 17, 2021

(54) CONTROL OF CONNECTIVITY FOR A VOICE-CAPABLE UE THAT WILL BE SERVED BY A NODE THAT DOES NOT SUPPORT VOICE-OVER-PACKET SERVICE

(71) Applicant: Sprint Spectrum L.P., Overland Park, KS (US)

(72) Inventors: Sougata Saha, Overland Park, KS (US); Nick J. Baustert, Olathe, KS (US); Sreekar Marupaduga, Overland Park, KS (US); Rajveen Narendran, Olathe, KS (US); Saravana Velusamy, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 6 days.

(21) Appl. No.: 16/238,322

(22) Filed: Jan. 2, 2019

(51) Int. Cl.
| | | |
|---|---|---|
| *H04W 36/00* | (2009.01) | |
| *H04W 76/16* | (2018.01) | |
| *H04L 29/06* | (2006.01) | |
| *H04W 60/00* | (2009.01) | |

(52) U.S. Cl.
CPC ..... *H04W 36/0022* (2013.01); *H04L 65/1006* (2013.01); *H04L 65/1016* (2013.01); *H04W 60/00* (2013.01); *H04W 76/16* (2018.02)

(58) Field of Classification Search
CPC ..... H04W 36/00; H04W 88/08; H04W 36/30; H04W 4/00; H04W 88/06; H04W 48/16; H04W 48/18; H04W 36/0022; H04W 36/04; H04W 76/15; H04W 72/085; H04W 24/10; H04W 40/24; H04W 28/0268; H04W 84/042; H04W 28/0242; H04W 36/08; H04W 36/0027; H04W 36/0079; H04W 8/08; H04L 65/1016; H04L 29/06; H04L 43/0829; H04L 43/16; H04M 15/00; H04M 15/06
USPC .................................................. 370/329, 331
See application file for complete search history.

(56) References Cited

U.S. PATENT DOCUMENTS

| | | | | |
|---|---|---|---|---|
| 8,504,043 | B2 * | 8/2013 | Wu | H04W 36/0022 455/436 |
| 9,084,287 | B2 * | 7/2015 | Swaminathan | H04W 88/06 |
| 9,125,069 | B2 * | 9/2015 | Nakata | H04W 52/40 |
| 9,219,759 | B2 * | 12/2015 | Zisimopoulos | H04L 65/1016 |
| 9,344,899 | B2 * | 5/2016 | Nakata | H04W 52/40 |

(Continued)

OTHER PUBLICATIONS

"3rd Generation Partnership Project; Technical Specification Group Radio Access Network; Evolved Universal Terrestrial Radio Access (E-UTRA) and NR; Multi-connectivity; Stage 2 (Release 15)," 3GPP TS 37.340 V15.2.0 (Jun. 2018).

*Primary Examiner* — Man U Phan

(57) ABSTRACT

A mechanism to help control connectivity of a user equipment device (UE). When the UE is served by a master node (MN) that does not support VOP service, the MN will cause the UE to not have a secondary connection with a secondary node (SN) that would engage in control-plane signaling with the UE via the UE's master connection with the MN. For instance, in that situation, the MN could avoid setting up the secondary connection for the UE in the first place. Or if the secondary connection exists already, the MN could tear down that secondary connection. By causing the secondary connection to not exist, the mechanism may help to avoid problems with operation of the secondary connection as a result of the UE tuning away to facilitate voice service.

17 Claims, 5 Drawing Sheets

(56) References Cited

U.S. PATENT DOCUMENTS

| | | | | |
|---|---|---|---|---|
| 9,503,484 | B2* | 11/2016 | Zisimopoulos | H04L 65/1066 |
| 9,516,557 | B2* | 12/2016 | Zhu | H04W 36/0022 |
| 9,648,522 | B2* | 5/2017 | Wu | H04W 36/0022 |
| 9,706,448 | B2* | 7/2017 | Naik | H04W 36/0022 |
| 9,807,590 | B2* | 10/2017 | Pinheiro | H04B 7/088 |
| 9,900,807 | B2* | 2/2018 | Wu | H04L 65/1096 |
| 10,142,490 | B2* | 11/2018 | Jeong | H04W 4/16 |
| 10,149,217 | B2* | 12/2018 | Kubota | H04W 36/165 |
| 10,178,585 | B2* | 1/2019 | Huang-Fu | H04W 36/0022 |
| 10,397,835 | B2* | 8/2019 | Wu | H04W 36/0022 |
| 10,420,161 | B1* | 9/2019 | Sava | H04W 72/085 |
| 10,477,438 | B2* | 11/2019 | Huang-Fu | H04W 36/04 |
| 10,660,152 | B1* | 5/2020 | Raghunathan | H04W 88/10 |
| 2015/0003411 | A1* | 1/2015 | Sandhu | H04W 36/0022 370/331 |
| 2015/0131619 | A1 | 5/2015 | Zhu et al. | |
| 2018/0132141 | A1 | 5/2018 | Huang-Fu et al. | |
| 2019/0007875 | A1* | 1/2019 | Gheorghiu | H04W 24/10 |
| 2019/0104456 | A1* | 4/2019 | Kubota | H04W 74/00 |
| 2019/0182741 | A1* | 6/2019 | Oyman | H04M 15/88 |
| 2019/0357075 | A1* | 11/2019 | Van Der Velde | H04W 28/0268 |
| 2020/0100118 | A1* | 3/2020 | Sun | H01Q 3/2605 |
| 2020/0107232 | A1* | 4/2020 | Dong | H04W 76/15 |

\* cited by examiner

CONTROL OF CONNECTIVITY FOR A VOICE-CAPABLE UE THAT WILL BE SERVED BY A NODE THAT DOES NOT SUPPORT VOICE-OVER-PACKET SERVICE

BACKGROUND

A cellular wireless network typically includes a number of base stations, that are configured to provide wireless coverage areas, such as cells and cell sectors, in which user equipment devices (UEs) such as cell phones, tablet computers, machine-type-communication devices, tracking devices, embedded wireless modules, and/or other wirelessly equipped communication devices (whether or not user operated), can operate. Each base station could be coupled with a core network that provides connectivity with various application servers and/or transport networks, such as the public switched telephone network (PSTN) and/or the Internet for instance. With this arrangement, a UE within coverage of the cellular network could engage in air interface communication with a base station and could thereby communicate via the base station with various application servers and other entities.

Such a network could operate in accordance with a particular air interface protocol (or radio access technology), with communications from the base stations to UEs defining a downlink or forward link and communications from the UEs to the base stations defining an uplink or reverse link.

In accordance with the air interface protocol, each coverage area could operate on one or more carriers, each of which could be frequency division duplex (FDD), defining separate frequency channels for downlink and uplink communication, or time division duplex (TDD), with a single frequency channel multiplexed over time between downlink and uplink use. Further, on the downlink and uplink, each such carrier could be structured to define various physical channels for carrying information between the base stations and UEs.

Over the years, the industry has embraced various "generations" of air interface protocols, in a continuous effort to increase available data rate and quality of service for end users. These generations have ranged from "1G," which used simple analog frequency modulation to facilitate basic voice-call service, to "2G" or "3G," such as Code Division Multiple Access (CDMA), which used spread spectrum coding to facilitate circuit-switched voice service, to "4G"—such as Long Term Evolution (LTE), which facilitates mobile broadband service using technologies such as orthogonal frequency division multiplexing (OFDM) and multiple input multiple output (MIMO). And most recently, the industry is now exploring developments in "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

As the industry advances from one generation of wireless air interface technology to the next, issues arise with the need for UEs to support potentially multiple air interface protocols at once. With the transition from 4G to 5G, for instance, it is expected that UEs will be configured to support use of both technologies concurrently, with an arrangement referred to as EUTRA-NR Dual Connectivity (EN-DC). With such an arrangement, a UE might include a 4G radio and a 5G radio, with the 4G radio being served by a 4G base station concurrently with the 5G radio being served by a 5G base station. This arrangement could help support transition from 4G technology to 5G technology and may provide other benefits as well. More generally, dual connectivity could encompass service on two or more air interface protocols concurrently, to facilitate technology transitions or for other purposes.

OVERVIEW

In a representative dual-connectivity arrangement, one base station could operate as a master node (MN) with which the UE initially connects, and another base station could operate as a secondary node (SN) that operates to provide additional frequency bandwidth so as to support higher throughput or the like. For example, with an example implementation of EN-DC, a 4G base station (e.g., an evolved Node-B (eNB)) could operate as the MN, and a 5GNR base station (e.g., a gigabit Node-B (gNB)) could operate as the SN.

When the UE enters into coverage of the MN, the UE could discover the MN coverage and could responsively engage in signaling with the MN to establish a connection between the UE and the MN, referred to as a master connection. Further, the UE could engage in attach signaling with a core network controller via the master connection, to attach or register for service with the network, and the core network controller could responsively coordinate establishment for the UE of one or more bearers anchored at the MN, for carrying user-plane packet data communications to and from the UE.

The MN could then serve the UE with wireless packet-data communications. For instance, when packet-data arrives at the MN for transmission to the UE, the MN could allocate downlink air interface resources (e.g., time-frequency resources) on which to transmit the data to the UE, the MN could transmit to the UE a scheduling directive that indicates the transmission will occur on the allocated resources, and the MN could transmit the data to the UE as indicated. And when the UE has data to transmit, the UE could send to the MN a scheduling request, the MN could responsively allocate uplink resources on which the UE will transmit the data to the MN and could transmit to the UE an associated scheduling directive, and the UE could transmit the data to the MN accordingly. Further, other signaling communication such as acknowledgement signaling and the like could pass between the UE and the MN to help manage these transmissions over the master connection.

In addition, the MN could engage in a process to add a secondary connection for the UE, to help increase frequency bandwidth and throughput available for the UE. For instance, the MN could direct the UE to scan for secondary coverage and could responsively receive a report from the UE that the UE detected threshold strong coverage of an SN. The MN could then responsively engage in signaling with the SN and with the UE to coordinate establishment of a secondary connection between the UE and the SN, and the MN could further engage in to prepare the SN to serve the UE, and the MN could engage in signaling with the core network controller to cause the core network controller to split one or more of the UE's established bearer(s) so as to have each such bearer connect both with the MN and with the SN.

With such dual-connectivity established, the MN could serve the UE with user-plane data communications over the master connection while the SN serves the UE with user-plane data communications over the secondary connection.

When the core network has data for transmission to the UE, the core network could send some of that data over one leg of the UE's split bearer to the MN for transmission over the master connection to the UE, and the core network could send other of that data over another leg of the UE's split bearer to the SN for transmission over the secondary connection to the UE. And likewise, when the UE has data to transmit, the UE could transmit some of that data over the master connection to the MN for forwarding by the MN over a leg of the UE's split bearer, and the UE could transmit other of the data over the secondary connection to the SN for forwarding by the SN over another leg of the UE's split bearer. Note that, in an alternative embodiment, the bearer split could occur at the MN itself, with some of the UE's data flowing between the MN and the SN.

In an example of such an arrangement, control-plane signaling related to both the UE's communication on the master connection and the UE's communication over the secondary connection could flow over the master connection.

In particular, the MN could operate as discussed above, engaging in user-plane communication with the UE over the master connection, and engaging in control-plane signaling with the UE over the master connection to schedule and otherwise manage that user-plane communication. Further, the SN could engage in user-plane communication with the UE over the secondary connection, but the SN's control-plane signaling with the UE could pass through the MN and the master connection.

With this arrangement, when the SN has control-plane signaling (such as scheduling directives, acknowledgements of uplink user-plane communication, etc.) to send to the UE, the SN could transmit that control-plane signaling over an inter-base-station interface to the MN and the MN could transmit the control-plane signaling over the master connection to the UE. Likewise, when the UE has control-plane signaling (such as scheduling requests, acknowledgements of downlink user-plane communications, etc.) to send to the SN, the UE could transmit that control-plane signaling to the MN, and the MN could forward the control-plane signaling via an inter-base-station interface to the SN for processing.

One technical problem that can arise in this scenario is that, if the UE loses its master connection with the MN, control-plane signaling between the UE and the SN could fail, and associated user-plane communication between the UE and the SN could fail.

For example, if the SN provides a scheduling directive for downlink packet-data transmission to the UE and engages in that scheduled downlink transmission, if that scheduling directive does not make it to the UE due to the UE not being in master-connection communication with the MN, then that downlink packet-data transmission may fail. Likewise, if the SN provides a scheduling directive for uplink packet-data communication from the UE and expects to receive that uplink transmission from the UE, if that scheduling directive does not make it to the UE due to the UE not being in master-connection communication with the MN, then that uplink packet-data communication may fail. Similar problems could arise as a result of failure of other control-plane communication related to the secondary connection, such as failure of acknowledgement signaling or the like.

Without limitation, an example situation where this problem can arise is if the UE, when served by the MN, periodically tunes away from its master connection with the MN. If the UE is so set to tune-away periodically, the MN may be aware of that tune-away schedule and may avoid engaging in communication with the UE during times when the UE is scheduled to be tuned away. But the SN may not be aware of the UE's tuneaway schedule. And if the SN attempts to engage in control-plane signaling with the UE during times when the UE is tuned away from the MN and the master connection, that SN control-plane signaling, and perhaps associated SN user-plane communication, could fail as discussed above—due to the lack of a master connection over which to convey that SN control-plane signaling to the UE.

A UE could be set to periodically tune away from its serving MN if the UE supports voice-call service and the UE is operating in a mode where the UE is set to be served with voice-call service by a separate network, such as to be served with voice-over-circuit (VOC) service by a legacy CDMA network for instance. In that situation, while the UE is served by the MN, the UE might also be registered for service by the separate network and might tune away periodically from the MN to check for voice-call page messages or the like from the separate network. Without limitation, an example of such a mode is Single-Radio-LTE (SRLTE), where the UE has a single radio that the UE uses for either LTE communication with the MN or CDMA communication with a CDMA base station but not both concurrently.

A UE may be set to operate in such a mode in a situation where the MN itself does not support voice over packet (VOP) service, perhaps due to lack of programming or hardware to support voice coding and associated features. Some MNs in the network might support VOP service but others might not. If the UE ends up being served by an MN that supports VOP service, then the UE might be set to engage in any voice calling using VOP service served by the MN. But if the UE ends up being served by an MN that does not support VOP service, then the UE may need to operate in the mode discussed above in order to be able to place and receive voice calls, in which case the above-discussed problems may arise.

Disclosed herein is a mechanism to help address this problem.

In accordance with the disclosure, when a UE is served by an MN that does not support VOP service, the MN will cause the UE to not have a secondary connection with an SN that would engage in control-plane signaling with the UE via the UE's master connection with the MN. For instance, in that situation, the MN could avoid setting up the secondary connection for the UE in the first place. Or if the secondary connection exists already, the MN could tear down that secondary connection.

By causing the secondary connection to not exist in a situation where the UE's serving MN does not support VOP service, this process helps to avoid failure of the SN control-plane signaling at times when the UE periodically tunes away from the MN to facilitate circuit-switched voice-call service or the like.

These as well as other aspects, advantages, and alternatives will become apparent to those reading the following description, with reference where appropriate to the accompanying drawings. Further, it should be understood that the discussion in this overview and elsewhere in this document is provided by way of example only and that numerous variations are possible.

DETAILED DESCRIPTION

An example implementation will now be described in the context of a system including an EN-DC network and a legacy CDMA network. However, it should be understood that the principles disclosed herein could extend to apply with respect to other scenarios as well, such as with respect to other air interface protocols and services. Further, it should be understood that other variations from the specific arrangements and processes described are possible. For instance, various described entities, connections, functions, and other elements could be added, omitted, distributed, re-located, re-ordered, combined, or changed in other ways.

Figure 1:
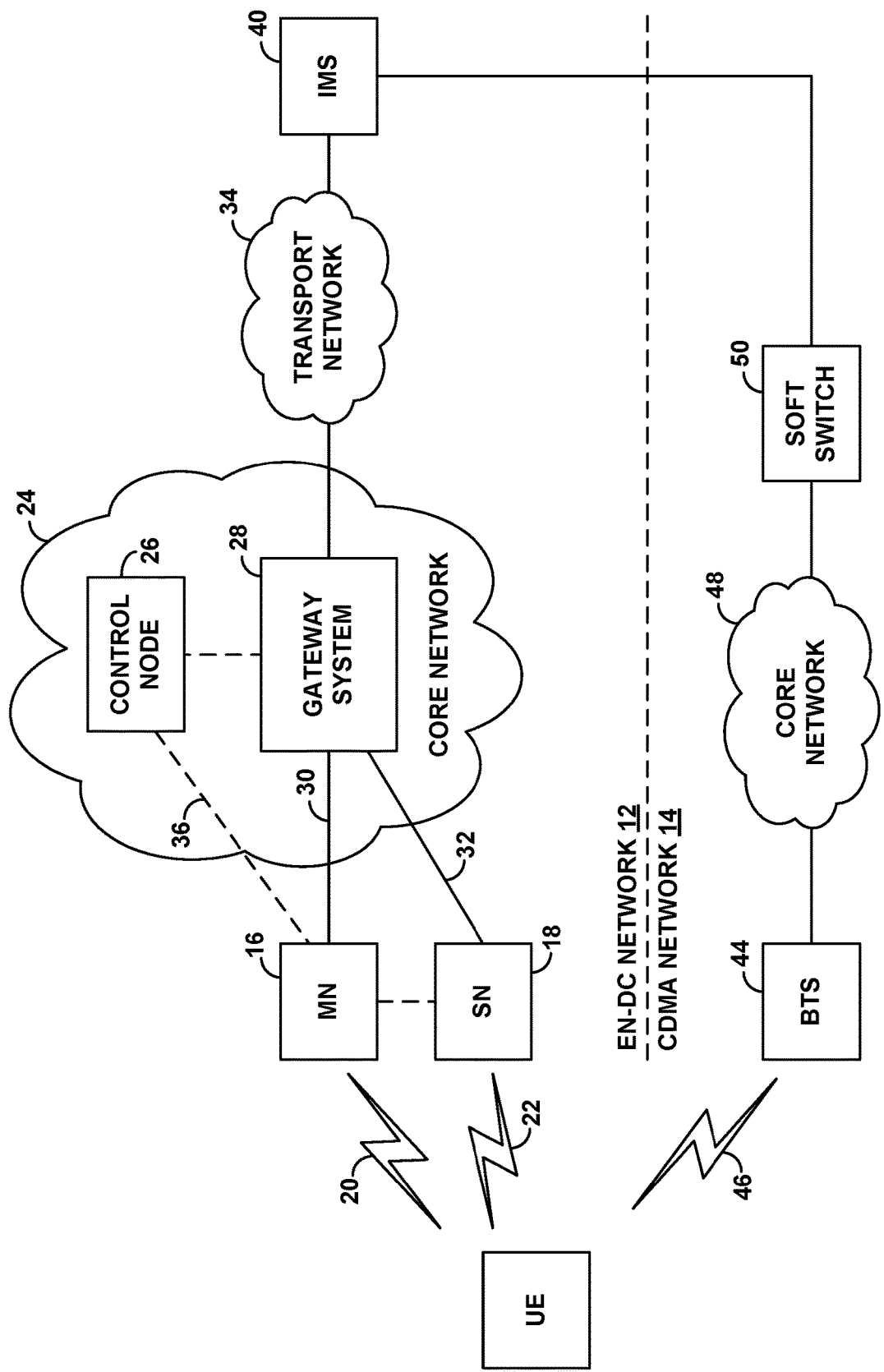
FIG. 1 is a simplified block diagram of an example network arrangement in which aspects of the present disclosure can be implemented.

FIG. 1 is a simplified block diagram of an example network arrangement, showing at its top portion an EN-DC network 12 for providing wireless-packet-data service according to 4G LTE and 5G NR protocols, and showing at its bottom portion a legacy CDMA network 14 for providing wireless circuit-data services such as legacy circuit-switched voice call service for instance.

EN-DC network 12 includes a representative MN 16, likely an LTE eNB, and a representative SN 18, likely a 5G NR gNB. The MN 16 and SN 18 could be co-located at a common cell site, sharing an antenna tower or other antenna structure, and sharing baseband hardware or the like, but being separately defined to provide discrete 4G and 5G connections and service. The MN and SN could each be configured to provide respective coverage 20, 22 on one or more carriers as discussed above, defining respective frequency bandwidth and air interface resources for carrying communications wirelessly to/from served UEs.

In a representative implementation, respective coverage on each carrier of the 4G and 5G coverage 20, 22 could be divided over time into frames, subframes, timeslots, and symbol segments, and could be divided over frequency bandwidth into subcarriers. As a result, the respective coverage could define an array of time-frequency resource elements, in which subcarriers can be modulated to carry data communications.

In each subframe, these resource elements could be divided into groups defining physical resource blocks (PRBs) that are allocable by the associated base station (MN or SN) on an as-needed basis to carry data communications. And certain resource elements per subframe could be reserved for other purposes. In LTE for instance, a first time portion of each downlink subframe is reserved as a control region to carry downlink control-plane signaling such as scheduling directives and acknowledgement messaging, and the low-end and high-end portions of the carrier bandwidth in each uplink subframe are reserved as a control region to carry uplink control-plane signaling such as scheduling requests. In addition, designated resource elements could be reserved to carry other signals, such as synchronization signals, broadcast-channel signals, reference signals, random-access signals, and the like.

As further shown, the MN and SN are each connected with a core network 24, which includes a gateway system 26 and a control node 28. In an example EPC network, the gateway system includes a serving gateway (SGW) and a packet-data network gateway (PGW), with the SGW having a communication interface 30 with the MN and a communication interface 32 with the SN, and with the PGW providing connectivity with a transport network 34 such as the Internet or a private network. And the control node 26 could be a mobility management entity (MME), which could have a communication interface 36 with the MN and a communication interface 38 with the gateway system 28 (e.g., with the SGW).

Also shown accessible on or via transport network 34 is an Internet Multimedia Subsystem (IMS) 40. The IMS supports VOP service (and equally other type of packet-based real-time media services) for served UEs. For instance, the IMS may support Session Initiation Protocol (SIP) signaling with served UEs to set up and manage VOP calls, and the IMS may include a media server to bridge and connect such calls to remote call parties or the like. Thus, a served UE might engage in SIP signaling with the IMS to set up an incoming or outgoing VOP call, establishing a packet-based real-time media session (e.g., Real-time Transport Protocol (RTP) session) between the UE and IMS, which the IMS could bridge with a remote party, to facilitate voice call communication between the UE and the remote party.

When a UE 42 initially enters into coverage of this EN-DC network 12, the UE could discover coverage of the MN, such as by scanning predefined 4G carriers to find a synchronization signal from the MN and then evaluating to determine that a reference signal from the MN is strong enough to justify connecting. The UE could then engage in random-access signaling and RRC signaling as discussed above to establish an RRC connection with the MN, defining a master connection between the UE and the MN.

The UE could then engage in attach signaling with the control node 26, via that master connection and MN, to register for service with the network 12. And after authenticating the UE, the control node 26 could responsively coordinate setup for the UE of at least one user-plane bearer including an S1-U portion extending over interface 30 between the MN and the gateway system. Further, the control node 26 and/or the UE could provide the MN with a set of capabilities data describing capabilities of the UE, and the MN could store that data in a context record associated with the UE's master connection.

In a basic arrangement, the control node 26 could set up a best-efforts bearer for the UE at this stage, to enable the UE to engage in general Internet data communication. Further, if the UE supports VOP service and if the MN supports VOP service, the control node 26 could also set up for the UE an IMS signaling bearer that the UE could use to engage in SIP signaling with the IMS 40 as discussed above.

As noted above, the MN could further work to set up for the UE a secondary connection served by SN 18, with the MN functioning as an anchor point for control-plane signaling related to both the MN's master connection with the UE and the SN's secondary connection with the UE. In particular, the MN could send to the UE an RRC message that directs the UE to scan for and report any threshold coverage that the UE detects on 5G carriers. And upon receipt of such a report from the UE specifying that the UE detected threshold strong coverage of coverage of SN 18, the MN could then engage in signaling to set up the secondary connection. For instance, the MN could engage in inter-base-station signaling with the SN to prepare the SN to serve the UE over the secondary connection, (ii) the MN could send a directive to the UE to cause the UE to engage in signaling with the SN to establish the secondary connection, and (iii) the MN could engage in signaling with the control node 26 to cause the control node to coordinate setup for the UE of a split bearer including the existing leg with MN over interface 30 and a new leg with SN over interface 32.

As discussed above, the MN and SN could then cooperatively provide the UE with EN-DC service.

For example, as the gateway system receives downlink data destined to the UE, the gateway system could send some of that data respectively over each leg of the UE's split bearer. And the MN and SN could each schedule transmission to the UE of their respective portion of that data.

In this process, for communication of the data from the MN to the UE, the MN would generate and transmit over its master connection to the UE one or more scheduling directives that designate which PRBs will carry data to the UE over the master connection from the MN, and the MN would transmit the data to the UE in the designated PRBs of the master connection. Further, the MN would receive associated UE acknowledgement signaling from the UE over the master connection as well.

Likewise, for communication of the data from the SN to the UE, the SN would generate scheduling directives that would designate which PRBs will carry data to the UE over the secondary connection from the SN, and the SN would transmit the data to the UE in the designated PRBs of the secondary connection. However, the SN would transmit its scheduling directives over an inter-base-station interface to the MN for the MN to transmit over the master connection to the UE. And associated acknowledgement signaling from the UE to the SN would likewise pass over the master connection to the MN and over the inter-base-station interface from the MN to the SN.

In such a system where the UE will engage in VOP service, the MN might be configured to support the VOP service, but the SN might not. Thus, while the UE may make use of its EN-DC connections to engage in high-data-rate packet-data communications generally, the UE may use just its master connection with the MN, and not its secondary connection with the SN, to engage in VOP service. To facilitate voice service once the UE has connected with the MN, the UE may engage in SIP signaling with the IMS via the US's master connection and the UE's IMS signaling bearer to register with the IMS, so that the IMS will know where to reach the UE for calls placed to the UE. And when the UE has a voice call to place or the IMS has a voice call to connect to the UE, the UE might engage in SIP signaling with the IMS via the UE's master connection and the UE's IMS signaling bearer, and the UE may then engage in the resulting VOP call through the same path.

Turning next to the lower portion of FIG. 1, the example CDMA network is shown including a representative CDMA base station (base transceiver station (BTS)) 44. This BTS could be co-located with the MN and SN at a common cell site, sharing an antenna tower or other antenna structure, and sharing other equipment. But the BTS provides its own respective CDMA coverage 46. The CDMA coverage could be provided on a carrier, such as a 1.25 MHz carrier, with various dedicated circuits or channels defined on the carrier through spread-spectrum modulation using respective Walsh codes and a pseudo-random noise offset. For instance, the carrier might define a plurality of discrete traffic channels, access channels, paging channels, and the like.

As further shown, the BTS coupled with a core network 48. Core network 48 may include various nodes (not shown) such as a base station controller (BSC), a mobile switching center (MSC), a home location register (HLR), an interworking function (IWF), and a packet-data serving node (PDSN), among other possibilities. Further, the core network could include or be interconnected with a soft-switch 50, possibly instead of the MSC, which could interface between circuit-switched voice communications and associated signaling in the CDMA network and VOP communications and signaling at the IMS.

When a UE enters into coverage of the CDMA network, the UE could register for service with the CDMA network by transmitting a registration message over an access channel to the BTS, which the BTS could forward to the MSC. And the MSC could engage in registration-notification signaling with the HLR to record the fact that the UE is being served by the BTS.

When the UE seeks to place a voice call, the UE could then transmit an origination request message over an access channel to the BTS, which the BTS could forward to the MSC, and the MSC and/or soft-switch could engage in signaling to set up the call via the IMS. Further, the BTS could assign a dedicated traffic channel to the UE, to enable the UE to proceed with the call.

And when the core network 46 receives signaling indicating an incoming voice call for the UE, the network could route the call to the BTS, and the BTS could page the UE during an instance of a periodic paging interval in which the UE is scheduled to scan the CDMA air interface for page messages. Upon receipt of that page message, the UE could then transmit an page response on an access channel to the BTS, the BTS could assign a dedicated traffic channel to the UE, and the call can proceed.

In a representative implementation, the UE could be programmed to prefer operation with 4G over operation with CDMA network, so as to benefit from high-data-rate packet-data service. Thus, when the UE is initially scanning for coverage and service, if the UE finds both coverage of the 4G MN and coverage of the CDMA BTS, the UE may decide to establish a 4G connection with the MN as discussed above rather than registering for CDMA service.

On the other hand, the UE may need to be able to support voice call service—such as to facilitate emergency calling or for other reasons. Therefore, at issue for the UE may be whether the MN supports VOP service. To enable the UE to determine this, the MN could broadcast a system message that includes a Boolean "VOPS" value of either 1 to indicate that the MN support VOP service or 0 to indicate that the MN does not support VOP service. And the UE could read that broadcast message to determine whether the MN supports VOP service. Alternatively, the UE could determine in another manner whether the MN supports VOP service.

If the UE thereby determines that the MN supports VOP service, then the UE could connect with the MN and could then register with the IMS and be set to engage in IMS-based VOP service via the MN. Whereas, if the UE thereby determines that the MN does not support VOP service, then the UE could instead enter into SRLTE mode.

In particular, the UE could temporarily tune away from its master connection with the MN and engage in signaling with BTS 42 to register for CDMA service as discussed above, and the UE could then tune back to its existing connection with the MN. As the UE is served by the MN, the UE could then periodically tune away from the MN to check for CDMA page messages directed to the UE. The UE could have a particular paging slot cycle in the CDMA system, and the UE could tune away from the MN to the BTS periodically per that slot cycle. The UE could also inform the MN that the UE is operating in SRLTE mode, such as by sending to the MN a tracking area update or other signaling message carrying an indication that the UE is operating in SRLTE mode and perhaps an indication of the UE's slot cycle if the MN does not have that information already. That way, while the UE is served by the MN but is operating in SRLTE mode, the MN could avoid transmitting any communications during times when the UE is scheduled to be tuned away from the MN.

As discussed above, if the UE has dual connectivity with the MN and the SN, the UE's tuning away from the MN to check for CDNA page messages could have a detrimental impact on the UE's secondary connection with the SN. Namely, as noted above, the SN may be unaware of the fact the UE is tuned away from time to time, and the SN may provide control-plane signaling to the UE during those times. When the SN sends that signaling to the MN for transmission to the UE, the MN may then be unable to provide the transmission when desired. And as a result, the control-plane signaling (and perhaps associated user-plane signaling) from the SN to the UE may fail.

Per the present disclosure as discussed above, an approach to help solve this problem is to have the MN cause the UE's secondary connection with the SN to not exist, in response to determining that the UE will be operating in a mode in which the UE periodically tunes away from the MN. More particularly, the MN could avoid setting up the UE's secondary connection with the SN or could tear down such a connection if it exists already, in a situation where the MN does not support VOP service. By causing the UE's secondary connection to not exist in that situation, the UE could operate in SRLTE mode or the like without risk of creating problems with the secondary connection.

If the secondary connection for the UE does not already exist, the MN could avoid setting up that secondary connection by (i) forgoing signaling to the UE to cause the UE to scan for coverage of the SN and/or to connect with the SN, (ii) forgoing signaling to the SN to prepare the SN to serve the UE over the secondary connection, and/or (iii) forgoing signaling to the control node 26 to cause the control node to set up a split bearer leg connected with the SN, among other possibilities.

Whereas, if the secondary connection for the UE already exists, the MN could tear down that secondary connection by carrying out operations such as (i) signaling to the UE to cause the UE to discontinue use of the secondary connection, (ii) signaling to the SN to cause the SN to discontinue the secondary connection with the UE, and (iii) signaling to the control node 26 to cause the control node to tear down a split bearer leg that was connected with the SN for the UE.

By way of example, this process could address a situation where a UE is served with dual-connectivity by the MN and SN, where the SN engages in control-plane signaling with the UE via the UE's master connection with the MN, and where the MN does not support VOP service. In that situation, at the initiation of the MN or the UE, the MN could tear down the UE's secondary connection, so that the UE could then periodically tune away for voice service without having control-plane signaling issues with the SN.

Alternatively, the process could address a situation where the UE is served by just the MN (without dual-connectivity, where the MN might consider adding for the UE a secondary connection with an SN with which the UE would engage in control-plane signaling via the UE's master connection with the MN, and where the MN does not support VOP service. In that situation, at the initiation of the MN or UE, the MN could avoid setting up the secondary connection for the UE, so as to avoid creating a situation where the UE's periodically tuning away for voice service would create problems with the secondary connection.

As a more specific example of this, consider a scenario where the UE was served by a different MN than that shown in FIG. 1, where that MN supported VOP service, and where the UE handed over from being served by that MN to being served by MN 16 shown in FIG. 1 that does not support VOP service. In that handover process, the MN 16 might normally add for the UE a secondary connection with SN 18 or may make use of an existing secondary connection that was in place for the UE.

In that scenario, during and/or after setup of the master and secondary connections for the UE with MN 16 and SN 18 respectively, the UE could read a broadcast message from MN 18 and determine that the MN 16 does not support VOPS. And in response, the UE could then transition to operate in SRLTE mode and transmit to MN a tracking area update message or other message that carries one or more parameter values (i) that will indicate to the MN that the UE will now operate in SRLTE mode, so that the MN can handle communication scheduling for the UE accordingly, and (ii) to which the MN will respond by tearing down the UE's secondary connection with SN 18. Although tracking area update messages may normally be used to inform a serving base station that a UE has entered into a new tracking area, this process could thus make use of a tracking area update message as a way to cause its serving base station (MN) to tear down the UE's connection with another base station (SN).

Alternatively, MN 16 could discover during or after the handover of the UE to MN 16 that the UE is voice capable (e.g., per UE capabilities data) and that the source MN from which the UE handed over supported VOP service (e.g., per neighbor MN data). Given that MN 16 does not support VOP service, MN 16 could then responsively tear down a secondary connection that has been established for the UE or could responsively avoid setting up such a secondary connection for the UE.

Figure 2:
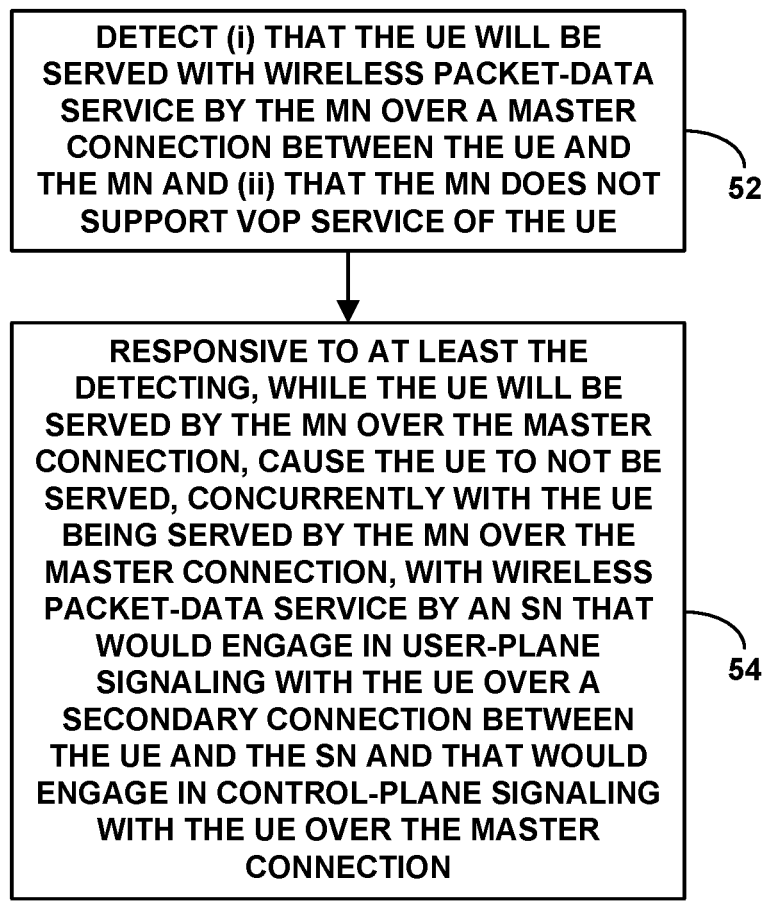
FIG. 2 is a flow chart depicting an example method in accordance with the disclosure.

FIG. 2 is a flow chart depicting an associated method. This method could be carried out by an MN and/or by the UE, to help control connectivity of the UE.

As shown in FIG. 2, at block 52, the method involves detecting (i) that the UE will be served with wireless packet-data service by the MN over a master connection between the UE and the MN and (ii) that the MN does not support VOP service of the UE. And at block 54, the method involves, responsive to at least the detecting, while (i.e., although) the UE will be served by the MN over the master connection, causing the UE to not be served, concurrently with the UE being served by the MN over the master connection, with wireless packet-data service by an SN that would engage in user-plane signaling with the UE over a secondary connection between the UE and the SN and that would engage in control-plane signaling with the UE over the master connection.

In line with the discussion above, the act of causing the UE to not be served with wireless packet-data service by the SN that would engage in control-plane signaling with the UE over the master connection could thus help to avoid failure of the control-plane signaling resulting from the UE periodically tuning away from the MN to facilitate VOC service. For instance, this could apply where the MN is an eNB, the SN is a gNB, and the UE tuning away from the MN to facilitate VOC service involves the UE tuning away from the eNB to check for pages from a base station operating in accordance with CDMA.

As further discussed above, the detecting operation could be carried out while the UE is already served by the MN over the master connection and could involve detecting that the UE will continue to be served by the MN over the master connection. Further, the act of causing the UE to not be served with wireless packet-data service by the SN that would engage in control-plane signaling with the UE over the master connection could involve the MN forgoing setup of the secondary connection for the UE.

Further, the detecting operation could be carried out while the UE is already served with wireless packet-data service by the SN, and the act of causing the UE to not be served with wireless packet-data service by the SN could involve the MN working to tear down the secondary connection between the UE and the SN.

In addition, as discussed above, the detecting operation could be carried out by the UE, and act of causing the UE to not be served with wireless packet-data service by the SN could involve the UE signaling to the MN to cause the MN (i) to forgo setup of the secondary connection for the UE or (ii) to tear down the secondary connection if the secondary connection is already set up. For instance, the UE could transmit to the MN over the master connection a tracking-area-update message that informs the MN that the UE is going to operate in a mode in which the UE will periodically tune away from the MN to facilitate VOC service, even though the UE has not entered into a new tracking area.

Alternatively, the detecting operation could be carried out by the MN, and the act of causing the UE to not be served with wireless packet-data service by the SN could involve the MN (i) forgoing setup of the secondary connection for the UE or (ii) tearing down the secondary connection if the secondary connection is already set up.

Still further, as discussed above, the MN could be a target MN for handover of the UE from a source MN to the target MN, and the method be carried out in relation to that handover, in a scenario where the source MN supports VOP service, so that the UE would be transitioning from a situation where its serving MN supports VOP service to a situation where its serving MN does not support VOP service. And in that case, the act of causing the UE to not be served with wireless packet-data service by the SN could likewise involve the MN (i) forgoing setup of the secondary connection for the UE or (ii) tearing down the secondary connection if the secondary connection is already set up.

Figure 3:
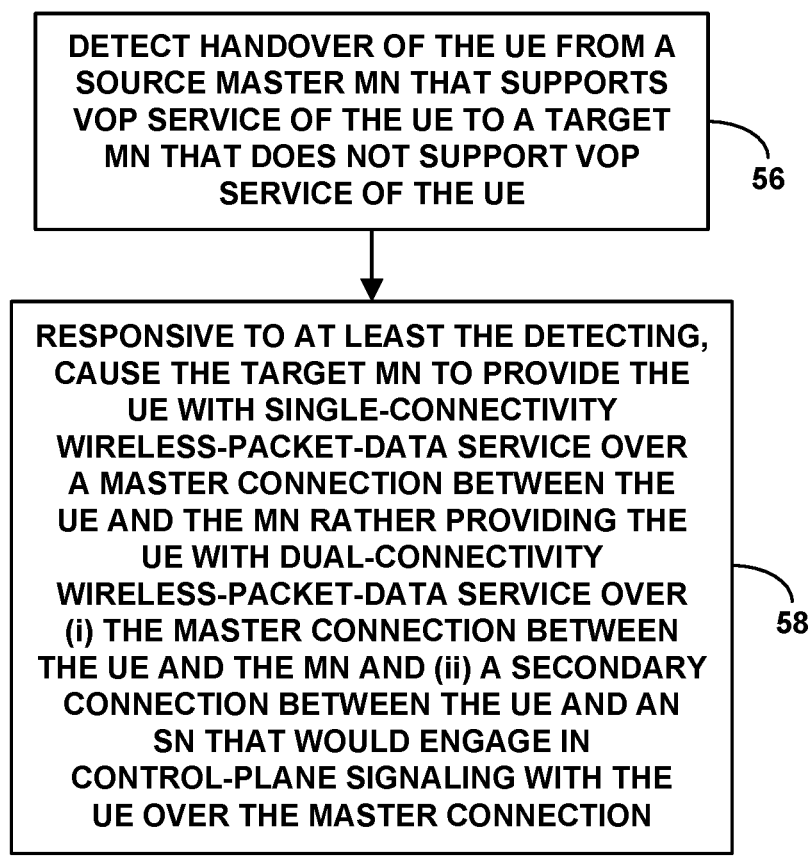
FIG. 3 is another flow chart depicting an example method in accordance with the disclosure.

FIG. 3 is another flow chart depicting an associated method, to control connectivity of a UE.

As shown in FIG. 3, at block 56, the method includes detecting handover of the UE from a source master MN that supports VOP service of the UE to a target MN that does not support VOP service of the UE. And at block 58, the method includes, responsive to at least the detecting, causing the target MN to provide the UE with single-connectivity wireless-packet-data service over a master connection between the UE and the MN rather providing the UE with dual-connectivity wireless-packet-data service over (i) the master connection between the UE and the MN and (ii) a secondary connection between the UE and an SN that would engage in control-plane signaling with the UE over the master connection.

Various features described above can be applied in this context, and vice versa.

In line with the discussion above, for instance, the act of providing the UE with the single-connectivity wireless-packet-data service rather than with the dual-connectivity wireless-packet-data service could help to avoid failure of the control-plane signaling resulting from the UE periodically tuning away from the MN to facilitate VOC service, again perhaps the scenario described above among other possibilities.

Further, the method could be carried out by the target MN, in which case the act of causing the causing the target MN to provide the UE with single-connectivity wireless-packet-data service rather providing the UE with dual-connectivity wireless-packet-data service could involve a controller of the target MN causing the target MN to forgo adding the secondary connection for the UE.

Alternatively, the method could be carried out by the UE, in which case the act of detecting handover of the UE from the source MN that supports VOP service of the UE to a target MN that does not support VOP service of the UE could include, in association with the handover, the UE receiving from the target MN a broadcast message that indicates the target MN does not support VOP service.

Figure 4:
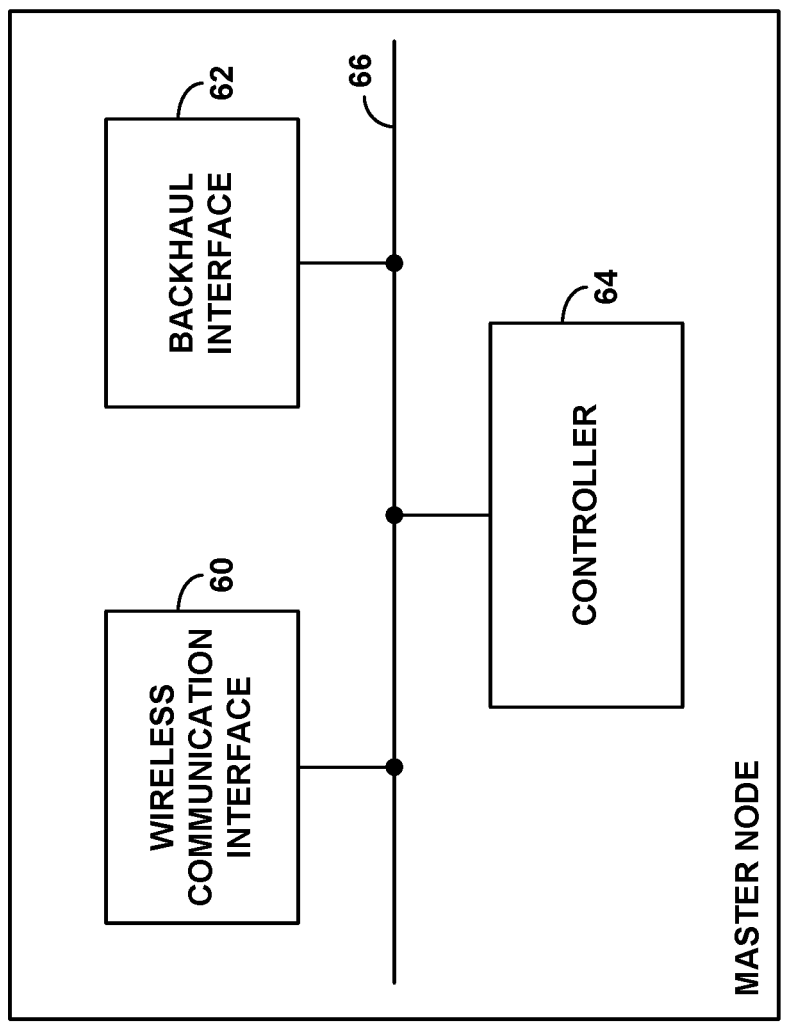
FIG. 4 is a simplified block diagram of an example MN operable in accordance with the disclosure.

FIG. 4 is a simplified block diagram of an example MN operable in accordance with present disclosure. As shown, the example NB includes a wireless communication interface 60, a backhaul interface 62, and a controller 64, all of which may be communicatively linked together by a system bus, network, or other connection mechanism 66 and/or could be integrated together or distributed in various ways.

In this example arrangement, the wireless communication interface 60 may be configured to provide cellular coverage and to engage in air interface communication with served UEs. As such, wireless communication interface 60 may comprise an antenna structure, which may be tower mounted or may take other forms, and associated components such as a power amplifier and a wireless transceiver, so as to facilitate providing a coverage area defining an air interface having a downlink and an uplink, and engaging in transmission and reception of bearer and control data over the air interface in accordance with an air interface protocol such as any of those noted above. Further, backhaul interface 62 may comprise a wired or wireless interface, such as an Ethernet network communication interface, configured to support communication with other entities, such as with various core network entities and other base stations for instance.

Controller 64 may then comprise control logic to cause the MN to carry out particular operations including those described herein. As such, the controller 64 may take various forms, including but not limited to a processing unit including one or more processors (e.g., general purpose microprocessors and/or dedicated processing units) and non-transitory data storage (e.g., one or more volatile and/or non-volatile storage components, such as magnetic, optical, or flash storage) holding program instructions executable by the processing unit to cause the MN to carry out various operations described herein. It should also be understood that the present disclosure also contemplates a non-transitory computer readable medium having encoded thereon program instructions executable to carry out such operations as well.

In an example implementation, for instance, the operations of the MN could include detecting (i) that a UE will be served with wireless packet-data service by the MN over a master connection between the UE and MN, (ii) that the UE is voice-capable, and (ii) that the MN does not support VOP service of the UE. And the operations could further include, responsive to at least the detecting, causing the UE to not be served, concurrently with the UE being served by the MN over the master connection, with wireless packet-data service by an SN that would engage in user-plane signaling with the UE over a secondary connection between the UE and the SN and that would engage in control-plane signaling with the UE over the master connection.

And as discussed above, the act of causing the UE to not be served with wireless packet-data service by the SN that would engage in control-plane signaling with the UE over the master connection could help to avoid failure of the control-plane signaling resulting from the UE periodically tuning away from the MN to facilitate VOC service, in the scenario described above or in other scenarios.

Figure 5:
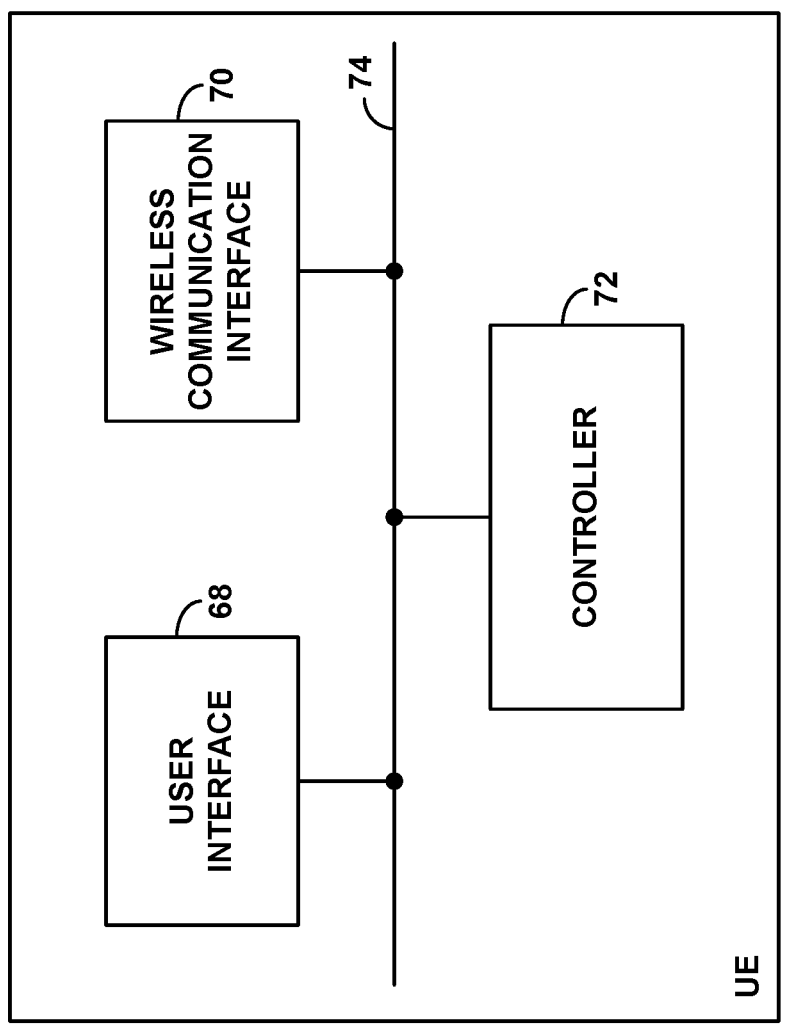
FIG. 5 is a simplified block diagram of an example UE operable in accordance with the disclosure.

FIG. 5 is a simplified block diagram of an example UE operable in accordance with the present disclosure. A shown, the example UE includes a user interface 68, a wireless communication interface 70, and a controller 72, all of which may be communicatively linked together by a system bus, network, or other connection mechanism 74 and/or could be integrated together or distributed in various ways.

In this example arrangement, the user interface 68 (which might be omitted if the UE is not user operated, such as if the UE is an automated voice communication device of some sort) could include input and output components that facilitate user interaction with the UE. The wireless communication interface 70 could then be configured to be served by base stations as discussed above, in accordance with agreed air interface protocols, and could comprise an antenna structure, power amplifier, and wireless transceiver.

And the controller 72 could comprise control logic to cause the UE to carry out particular operations including those described herein. For instance, the controller 72 could include a processing unit including one or more processors (e.g., general purpose microprocessors and/or dedicated processing units) and non-transitory data storage (e.g., one or more volatile and/or non-volatile storage components, such as magnetic, optical, or flash storage) holding program instructions executable by the processing unit to cause the UE to carry out various operations described herein. And here too, the present disclosure also contemplates a non-transitory computer readable medium having encoded thereon program instructions executable to carry out such operations as well.

Exemplary embodiments have been described above. Those skilled in the art will understand, however, that changes and modifications may be made to these embodiments without departing from the true scope and spirit of the invention.

We claim:

1. A method for controlling connectivity of a user equipment device (UE), the method comprising:
    detecting (i) that the UE will be served with wireless packet-data service by a master node (MN) over a master connection between the UE and MN and (ii) that the MN does not support voice-over-packet (VOP) service of the UE; and
    responsive to at least the detecting, while the UE will be served by the MN over the master connection, causing the UE to not be served concurrently by a secondary node (SN) that would engage in user-plane signaling with the UE over a secondary connection between the UE and the SN and that would engage in control-plane signaling with the UE over the master connection,
    wherein causing the UE to not be served concurrently by the SN while the UE will be served by the MN over the master connection comprises causing the UE to operate with single connectivity with the MN rather than with dual connectivity with the MN and the SN, and
    wherein causing the UE to not be served concurrently by the SN that would engage in control-plane signaling with the UE over the master connection helps to avoid failure of the control-plane signaling resulting from the UE periodically tuning away from the MN to facilitate voice-over-circuit (VOC) service.

2. The method of claim 1, wherein the MN is an evolved Node-B (eNB), wherein the SN is a gigabit Node-B (gNB), and wherein the UE tuning away from the MN to facilitate VOC service comprises the UE tuning away from the eNB to check for pages from a base station operating in accordance with Code Division Multiple Access (CDMA).

3. The method of claim 1, wherein the detecting is carried out while the UE is already served by the MN over the master connection, and wherein the detecting involves detecting that the UE will continue to be served by the MN over the master connection.

4. The method of claim 3, wherein the causing of the UE to not be served concurrently by the SN that would engage in control-plane signaling with the UE over the master connection comprises the MN forgoing setup of the secondary connection for the UE.

5. The method of claim 3,
    wherein the detecting is carried out while the UE already served with wireless packet-data service by the SN, and
    wherein the causing of the UE to not be served concurrently by the SN comprises the MN working to tear down the secondary connection between the UE and the SN.

6. The method of claim 1, wherein the detecting is carried out by the UE, and wherein the causing of the UE to not be served concurrently by the SN comprises the UE signaling to the MN to cause the MN (i) to forgo setup of the secondary connection for the UE or (ii) to tear down the secondary connection if the secondary connection is already set up.

7. The method of claim 6, wherein the UE signaling to the MN comprises the UE transmitting to the MN over the master connection a tracking-area-update message that informs the MN that the UE is going to operate in a mode in which the UE will periodically tune away from the MN to facilitate VOC service.

8. The method of claim 7, carried out even though the UE has not entered a new tracking area.

9. The method of claim 1, wherein the detecting is carried out by the MN, and wherein the causing of the UE to not be served concurrently by the SN comprises the MN (i) forgoing setup of the secondary connection for the UE or (ii) tearing down the secondary connection if the secondary connection is already set up.

10. The method of claim 1, wherein the MN is a target MN, the method being carried out in relation to handover of the UE to the target MN from a source MN that supports VOP service of the UE.

11. The method of claim 10, wherein the causing of the UE to not be served concurrently by the SN comprises the MN (i) forgoing setup of the secondary connection for the UE or (ii) tearing down the secondary connection if the secondary connection is already set up.

12. A method for controlling connectivity of a user equipment device (UE), the method comprising:
    detecting handover of the UE from a source master node (MN) that supports voice-over-packet (VOP) service of the UE to a target MN that does not support VOP service of the UE; and
    responsive to at least the detecting, causing the target MN to provide the UE with single-connectivity wireless-packet-data service over a master connection between the UE and the target MN rather providing the UE with dual-connectivity wireless-packet-data service over (i) the master connection between the UE and the target MN and (ii) a secondary connection between the UE and a secondary node (SN) that would engage in control-plane signaling with the UE over the master connection, wherein providing the UE with the single-connectivity wireless-packet-data service rather than with the dual-connectivity wireless-packet-data service helps to avoid failure of the control-plane signaling resulting from the UE periodically tuning away from the target MN to facilitate voice-over-circuit (VOC) service.

13. The method of claim 12, wherein the target MN is an evolved Node-B (eNB), wherein the SN is a gigabit Node-B (gNB), and wherein the UE tuning away from the target MN to facilitate VOC service comprises the UE tuning away from the eNB to check for pages from a base station operating in accordance with Code Division Multiple Access (CDMA).

14. The method of claim 12, carried out by the target MN, wherein causing the target MN to provide the UE with single-connectivity wireless-packet-data service rather providing the UE with dual-connectivity wireless-packet-data service comprises a controller of the target MN causing the target MN to forgo adding the secondary connection for the UE.

15. The method of claim 12, carried out by the UE, wherein detecting handover of the UE from the source MN that supports VOP service of the UE to a target MN that does not support VOP service of the UE includes receiving by the UE from the target MN a broadcast message that indicates the target MN does not support VOP service.

16. A master node (MN) configured to control connectivity of a user equipment device (UE), the MN comprising:
a wireless communication interface configured to engage in wireless communication with the UE;
a backhaul network interface through to communicate with other entities; and
a controller configured to cause the MN to carry out operations including:
 (a) detecting (i) that a UE will be served with wireless packet-data service by the MN over a master connection between the UE and MN, (ii) that the UE is voice-capable, and (ii) that the MN does not support voice-over-packet (VOP) service of the UE, and
 (b) responsive to at least the detecting, causing the UE to not be served, concurrently with the UE being served by the MN over the master connection, by a secondary node (SN) that would engage in user-plane signaling with the UE over a secondary connection between the UE and the SN and that would engage in control-plane signaling with the UE over the master connection,
wherein causing the UE to not be served concurrently with the UE being served by the MN over the master connection comprises causing the UE to operate with single connectivity with the MN rather than with dual connectivity with the MN and the SN, and
wherein causing the UE to operate with single connectivity with the MN rather than with dual connectivity with the MN and the SN helps to avoid failure of the control-plane signaling resulting from the UE periodically tuning away from the MN to facilitate voice-over-circuit (VOC) service.

17. The MN of claim 16, wherein the MN is an evolved Node-B (eNB), wherein the SN is a gigabit Node-B (gNB), and wherein the UE tuning away from the MN to facilitate VOC service comprises the UE tuning away from the eNB to check for pages from a base station operating in accordance with Code Division Multiple Access (CDMA).

* * * * *